United States Patent [19]

Miura et al.

[11] Patent Number: 4,555,717

[45] Date of Patent: Nov. 26, 1985

[54] INK JET PRINTING HEAD UTILIZING PRESSURE AND POTENTIAL GRADIENTS

[75] Inventors: Masayoshi Miura, Kawasaki; Hiroshi Naito, Tokyo, both of Japan

[73] Assignee: Matsushita Electric Industrial Company, Limited, Osaka, Japan

[21] Appl. No.: 505,353

[22] Filed: Jun. 16, 1983

[30] Foreign Application Priority Data

Jun. 16, 1982 [JP] Japan ................................ 57-104202

[51] Int. Cl.[4] ................................................ G01D 15/18

[52] U.S. Cl. ................................................ 346/140 R

[58] Field of Search ........................ 346/75, 1.1, 140 R

[56] References Cited

U.S. PATENT DOCUMENTS 4,403,228 9/1983 Miura et al. .......................... 346/75

4,403,234 9/1983 Miura et al. .................... 346/140 R

*Primary Examiner*—E. A. Goldberg

*Assistant Examiner*—Gerald E. Preston

*Attorney, Agent, or Firm*—Lowe, King, Price & Becker

[57] ABSTRACT

An ink jet printing head comprises a laminar airflow chamber having a front channel through a combined stream of air and ink droplets is discharged toward a writing surface, and a rear channel provided through an insulative plate and axially aligned with the front channel connected to a source of liquid. The chamber is further provided with an air intake connected to a pressurized air supply source for directing an airstream to a point between the front and rear channels so that the airstream makes a sharp turn at the entry into the front channel with the result that a sharp pressure gradient is produced in the liquid discharge path. A first electrode is provided around said front channel and second electrode is provided on a rear side wall of said insulative plate around said rear channel. Electric field is established between said first and second electrodes thereby causing the liquid's meniscus at the exit end of the rear channel to extend toward the front channel by the combined effects of the potential and pressure gradients and to be torn apart into a droplet which is carried by the airstream discharged through the front channel.

14 Claims, 15 Drawing Figures

INK JET PRINTING HEAD UTILIZING PRESSURE AND POTENTIAL GRADIENTS

BACKGROUND OF THE INVENTION

The present invention relates generally to nonimpact printing heads, and in particular to a novel ink jet printing head in which the effects of air pressure gradient and electric field are combined to form a jet stream of ink droplets.

It is known in the art to utilize electric field potentials to form a jet stream of ink droplets. The ink jet printer of this type comprises a plate electrode on which recording medium is placed. A liquid nozzle is pointed toward the electrode and biased negative with respect to the electrode. By a strong concentration of field at the meniscus of the liquid, the latter is attracted toward the electrode and torn apart into a droplet which is pulled toward the electrode and creates an image on the recording medium. However, the conventional system requires a considerably high operating voltage and results in a relatively large construction which makes it difficult to achieve multiple nozzle design for high speed printing.

SUMMARY OF THE INVENTION

The primary object of the invention is therefore to provide an ink jet printing head which is capable of high-speed, low-voltage operation and allows compact design.

According to the invention, the ink jet printing head comprises a laminar airflow chamber having a front channel through a combined stream of air and ink droplets is discharged toward a writing surface, and a rear channel axially aligned with the front channel connected to a source of liquid. The chamber is provided with an air intake connected to a pressurized air supply source for directing an airstream to a point between the front and rear channels so that the airstream makes a sharp turn at the entry into the front channel. This creates a sharp pressure gradient in the liquid discharge path. The rear channel is provided by opening an aperture on an insulating plate which forms an wall part of a liquid chamber. An electrode is provided on an inner wall of the insulating plate around the aperture. Around the front channel, another electrode is provided and an potential difference is applied between the electrodes. An electric field is thus established between the front channel and the meniscus of the liquid in the rear channel to cause the latter to extend toward the front channel by combined effects of the potential and pressure gradients and to be torn apart into a droplet which is carried by the airstream discharged through the front channel.

BRIEF DESCRIPTION OF THE DRAWINGS

The invention will be described in further detail with reference to the accompanying drawings, in which.

DETAILED DESCRIPTION OF THE INVENTION

Figure 1:
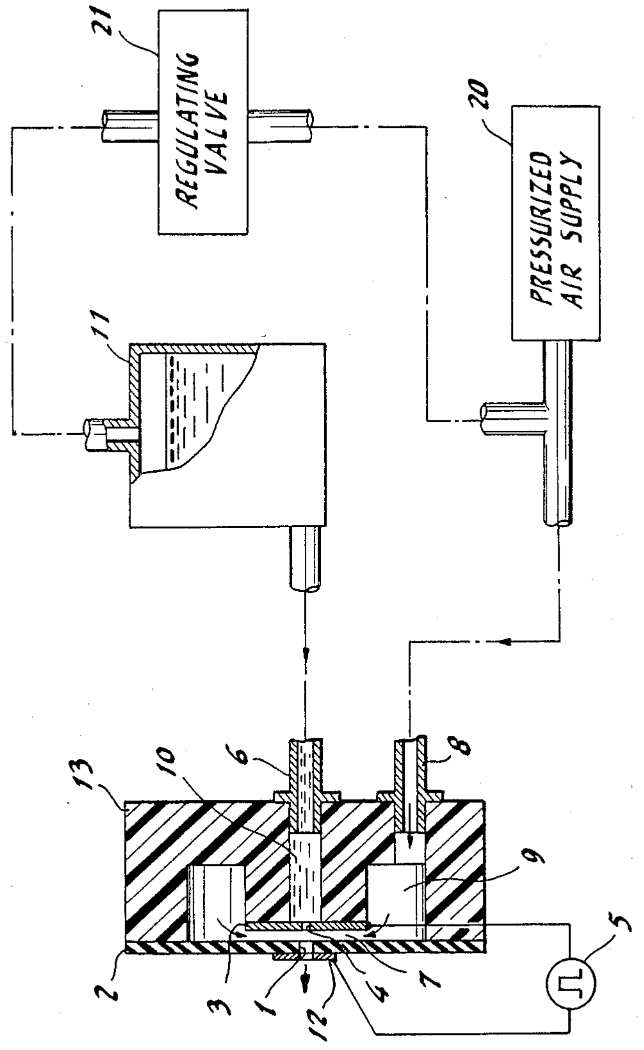
FIG.1 prior art
FIG. 1 is an illustration of a prior art ink jet printer.

Before describing the invention, reference will be made to FIGS. 1 and 2 in which a prior art ink jet printer is shown. A full description of this prior art ink jet printer is given in copending U.S. patent application Ser. No. 341,199, for Ink Jet Printing Head Utilizing Pressure and Potential Gradients, filed Jan. 20, 1982, now U.S. Pat. No. 4,403,234, issued Sept. 6, 1983, and assigned to the same assignee as the present invention. Similarly, applicants' copending application for Ink Jet Printing Head Having a Plurality of Nozzles, filed Mar. 18, 1982, now U.S. Pat. No. 4,403,228 incorporates the prior art approach.

A printing head comprises a front panel 2 of insulative material, a conductive nozzle plate 3 aligned parallel thereto which serves as an electrode for establishing an electric field and a rear block 13 of insulative material secured thereto. The rear block 13 is annularly grooved to define with the front panel 2 an outer or annular air chamber 9 which serves as a reservoir and is rearwardly recessed to define with it an inner disk-like laminar airflow chamber 7. The conductive plate 3 is provided with a liquid discharge channel or nozzle 4 and attached to the rear block 13.

The front plate 2 is provided with an air discharge channel or nozzle 1 which is axially aligned with the liquid discharge channel 4 and has a larger cross section than the cross section of the liquid discharge channel 4 to permit a combined stream of air and liquid to be discharged therethrough toward a writing surface, or recording sheet, with respect of which the printing head is reciprocally moved in a conventional manner. On a front surface of the front plate 2, an electrode 12 is provided around the air discharge channel.

An air supply conduit 8 is connected to the air chamber 9 to supply compressed air from a pressurized air supply source 20. The air introduced to the air chamber 9 is homogenized in the air chamber 9 and flows radially inwardly toward the air discharge channel 1 through an air layer 7 between the front panel 2 and the nozzle plate 3 and is discharged through the discharge channel 1 to the writing surface. The air flow is sharply bent at the entry to the air discharge channel 1, so that air pressure changes rapidly as a function of distance in the liquid discharge path.

On the other hand, a liquid supply conduit 6 is connected to an ink chamber 10 which is connected to the liquid discharge channel 4 to supply ink or colored liquid from a liquid container 11. The liquid in the container 11 is pressurized by compressed air supplied via a regulating valve 21 from a pressurized air supply source 20. The nozzle plate 3 and the electrode 12 are connected to terminals of a unipolar pulse source 5 so that the liquid in channel 1 is electrostatically biased to a given polarity to develop an electric field between its meniscus and the air discharge channel 1.

Figure 2:
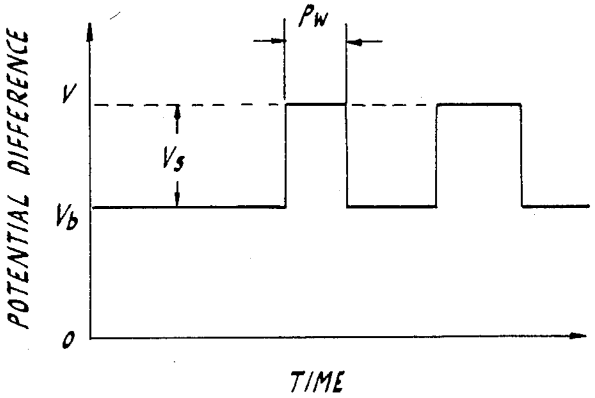
FIG. 2 prior art
FIG. 2 is a waveform of a driving signal applied to the prior art ink jet printer of FIG. 1.

The unipolar pulse waveform is shown in FIG 2. A bias voltage Vb is always applied between the nozzle plate 3 and the electrode 12. The voltage Vb is determined to hold the liquid meniscus generated at the outlet of the liquid discharge channel 4 and not to discharge liquid droplets. When a video signal is input, a signal voltage Vs is added to the bias voltage Vb and voltage difference V, which is sufficient to discharge an liquid droplet from the liquid discharge channel 4, is applied between the nozzle plate 3 and the electrode 12. In this time, the pulse width Pw of the signal voltage Vs must be larger than the minimum pulse width Pwm for discharging a liquid droplet. The example of the values of Vb, Vs and Pwm are as follows.

Vb: about 500 volts
Vs: 500–700 volts
Pwm: about 100 microseconds

The regulating valve 21 is manually adjusted in the absence of an electric field Vb so that the liquid pressure in the discharge channel 4 is statically balanced against the combined force of the air pressure acting on the meniscus of the liquid. When electric field Vb is applied the liquid is electrostatically charged with respect to the air discharge channel 1 and drawn out of channel 4 so that its mensicus takes the shape of a cone. Due to the increasing pressure gradient as mentioned above, the pulling force increases as the liquid is drawn. Therefore, in response to the application of a unipotential pulse Vs the liquid is torn off readily into a droplet under the combined gradients of electrical potential and air pressure. The droplet is carried by the airstream and expelled at a high speed through the discharge channel 1 to a recording medium.

In a practical embodiment, the air pressure acting on the meniscus is preferably in a range from 0.03 to 0.2 kilograms/cm$^2$. with the air pressure of this range, an air speed of about 40 to 150 meters/second is attained at the discharge end of the channel 1. A preferred value of the diameter of air channel 1 is approximately 250 micrometers or less to ensure that the air is discharged in a laminar flow.

Figure 3:
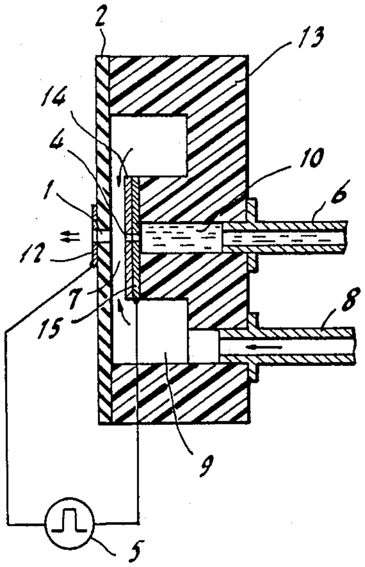
FIG. 3 is an illustration of an embodiment of a printing head of the invention.

Referring now to FIG. 3, there is shown a preferred embodiment of the ink jet printing head of the invention. In FIG. 3, construction of the liquid discharge channel 4 differs from that of FIG. 1. Namely, the liquid discharge channel 4 is provided by opening an aperture through an insulative plate 14 and a conductive plate 15 adhered thereto and the conductive plate 15, constructed as part of the liquid chamber 10, operates as the electrode for applying electrostatic biasing force to the liquid in the liquid discharge channel 4.

In the embodiment of FIG. 3, it is possible to discharge liquid droplets under the following conditions:

Vb≃400 volts
Vs≃200–600 volts
Pwm≃50 microseconds

In comparison with the dirving condition of FIG. 1, the embodiment of FIG. 3 is able to lower the biasing voltage Vb by about 100 V, the signal voltage Vs by about 300 V, and the variable range of Vs is broadened from about 200 V to about 400 V. Broad variable range of Vs makes it possible to change the amount of discharged liquid droplets in a broad range, and therefore it becomes easy to print an image having a wide range of half tone. Explaining in detail, a light image is printed with a small amount of the liquid droplets, available when Vs=200 V, a dark image is printed with a full amount of the liquid droplets in Vs=600 V, and a half tone image is printed with Vs in a wide range between 200–600 V.

Furthermore, the pulse width Pwm becomes half that required for the embodiment of FIG. 1. This means that the speed of printing becomes twice as fast and high speed printing is possible.

Figure 4A:
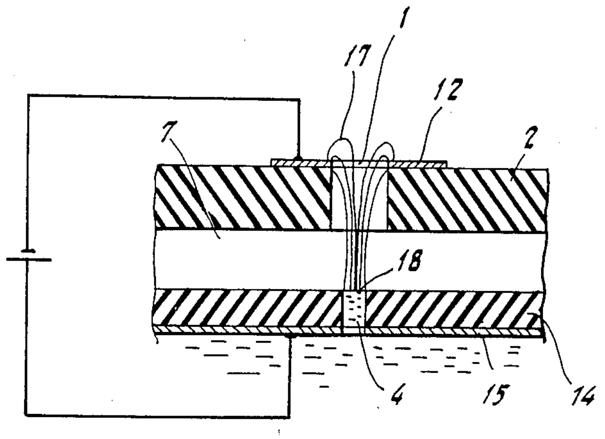
FIGS. 4*a* and 4*b* are respectively illustrations of a part of nozzle portion of FIG. 3 and FIG. 1.
Figure 4B:
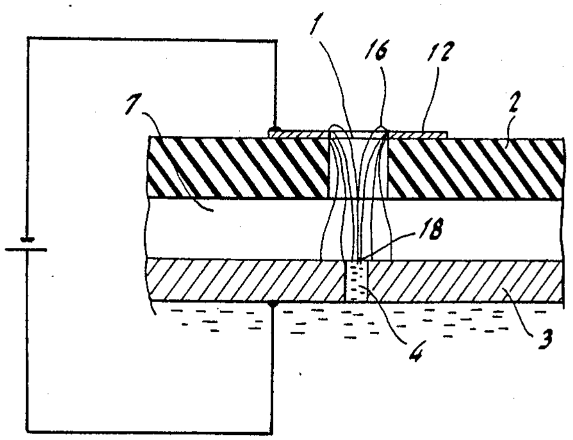

Referring now to FIGS. 4*a* and 4*b*, a detailed explanation of the difference between FIG. 3 and FIG. 1 is provided. In FIG. 4*b*, when a potential is applied between the electrode 12 and the nozzle plate 3, electric lines of force 16 are generated as illustrated. The electric lines of force 16 are distributed around the meniscus 18 of the liquid, so that it is necessary for discharging liquid droplets to apply pulses of high Vs and wide Pwm.

On the other hand, in FIG. 4*a* of the invention, electric lines of forces 17 are concentrated to the meniscus 18 of the liquid when a potential difference is applied between the electrode 12 and the conductive plate 15. the reason for this result is that the plate 14 is insulative and there is no conductive portion around the outlet of the liquid discharge channel 4. As a result, for concentrating the electric lines of forces to the meniscus of the liquid that a part around the outlet of the liquid discharge channel is at least made of insulative material. In this manner, high speed discharge of the liquid droplets are attained by low potential difference.

Figure 5:
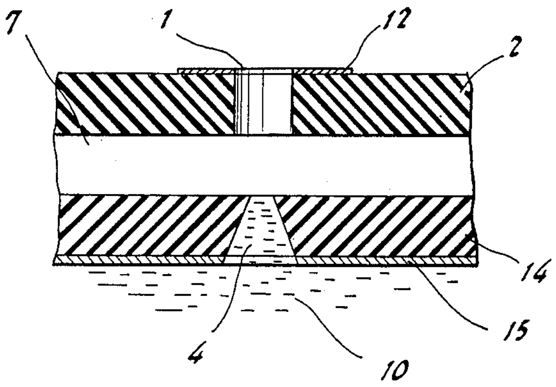
FIG. 5 is an illustration of a part of a modified nozzle portion of the printing head of the invention.

Referring to FIG. 5, there is shown a modified embodiment of the invention. The insulative plate 14 is usually made of plastics, glass, ceramics and so on. Because most of these materials are not rigid nor damageable, the insulative plate 14 needs to have a certain extent of thickness and therefore the liquid discharge channel 4 usually tends to become elongated. A long liquid discharge channel results in a large viscous drag of the liquid in the liquid discharge channel and the speed of the liquid discharge is reduced. The embodiment in FIG. 5 solves this problem. In FIG. 5, the liquid discharge channel 4 is formed by a tapered orifice or an orifice having gradually changed cross section. The orifice has a large opening at the inlet side thereof and a small opening at the outlet side thereof. This orifice operates to lower the viscous drag of the liquid in the orifice and prevents a drop the printing speed.

Apart from FIG. 5, it is useful, too, for the same object, that the liquid discharge channel 4 is constructed by an orifice opened through a thin and rigid metal plate, and that an insulative film such as metal oxide or high polymeric resin is coated on the metal plate at least around the outlet of the orifice.

Figure 6:
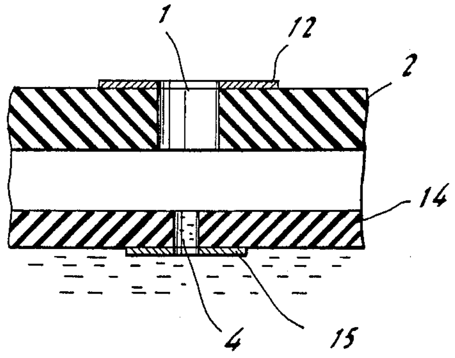
FIG. 6 is an illustration of a part of a further modified nozzle portion of the printing head of the invention.

FIG. 6 illustrates a further modified embodiment of the invention. In FIG. 6, the conductive plate 15 is partly provided on an inner wall side of insulative plate 14 around the liquid discharge channel 4. The conductive plate 15 need not adhere over the total area of the insulative plate 14. It is important in the invention that the material around the outlet of the liquid discharge channel is insulative and the material around the inlet of the liquid discharge channel is conductive which serves as an electrode. The embodiment of FIG. 6 is useful for a multi-nozzle type ink jet printer.

Figure 7:
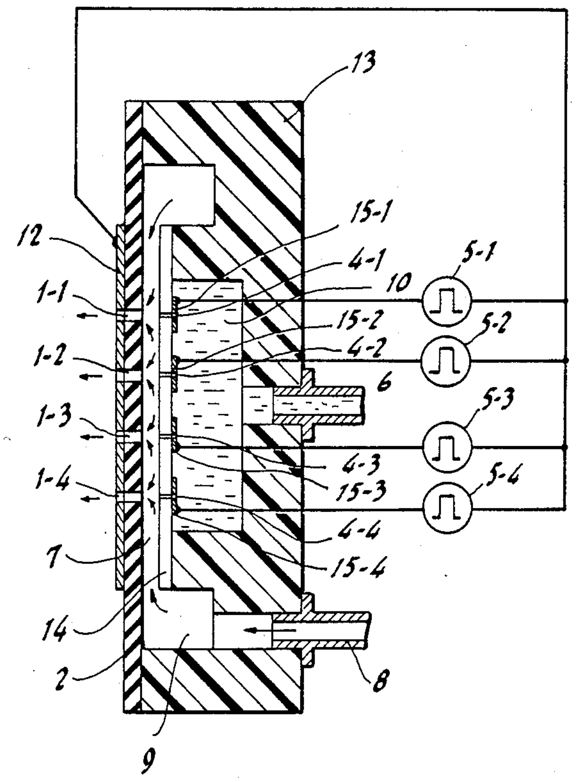
FIG. 7 is an illustration of a modified printing head of the invention.

Referring now to FIG. 7, there is shown a multi-nozzle type ink jet head of the invention. Air discharge channels 1-1 to 1-4 are provided with equal distance through an insulative nozzle plate 2. A common electrode 12 is provided on a front side of the nozzle plate 2 at areas at least in the vicinity of the outlets of the air discharge channels 1-1 to 1-4. An insulative plate 14 is provided in parallel relationship with the nozzle plate 2 and opposite side of the common electrode 12. Through the insulative plate 14, liqud discharge channels 4-1 to 4-4 are provided coaxially opposed to the air discharge channels 1-1 to 1-4 respectively. The insulative plate 14 and a body member 13 having recesses are attached to each other and a common liquid chamber 10 is formed between them. The liquid chamber 10 is connected to the liquid discharge channels 4-1 to 4-4 and connected to a liquid container (not shown) via a liquid supply conduit 6. On the inner side of the insulative plate 14, electrodes 15-1 to 15-4 which are separated from each other are provided around the inlets of the liquid discharge channels 4-1 to 4-4. An air chamber 9 is surrounded by the nozzle plate 1 and the body member 13 to which compressed air is supplied from pressurized air supply source (not shown) via an air supply conduit 8. The air introduced to the air chamber 9 flows radially inwardly toward the air discharge channels 1-1 to 1-4 where the air flow path is sharply bent and discharged therethrough to the writing surface. The liquid in the liquid chamber 10 is compressed by a constant pressure, whereby the liquid pressure in the discharge channels 4-1 to 4-4 is statically balanced against the combined force of the air pressure acting on the meniscus of the liquid and its surface tension in the absence of an electric field.

The electrodes 15-1 to 15-4 are each connected respectively to one terminal of signal sources 5-1 to 5-4, other terminals thereof being connected to the common electrode 12. When electrical potential is supplied between each of electrodes 15-1 to 15-4 and the common electrode 12, liquid droplets are discharged from each of the liquid discharge channel and flown through the air discharge channels with the airstreams by means of electrostatic force generated by the potential and pressure gradient obtained by the airflow as is described in FIG. 1.

By using the ink jet head shown in FIG. 7, very high speed printing is possible because the discharge of liquid from each of liquid discharge channels 4-1 to 4-4 can be controlled simultaneously and independently of each other. For example N times high speed printing is achieved when N liquid discharge channels and air discharge channels are provided.

The liquid discharge channels 4-1 to 4-4 in FIG. 7 are very small so that it is easy to dispose them in high density. Furthermore, it is easy to prevent electrical discharges between each of the electrodes 15-1 to 15-4 by using high insulative liquid, for example, oily ink.

Figure 8:
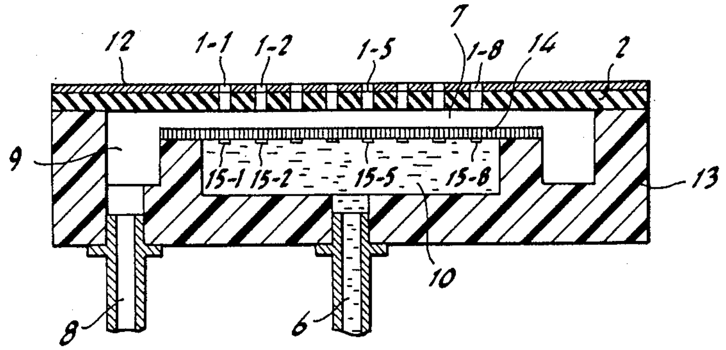
FIG. 8 is an illustration of a further modified printing head of the invention.

The printing head of FIG. 7 can be modified into various forms as illustrated in FIGS. 8 to 11. In FIG. 8, the insulative plate 14 has a multitude of very small apertures some of which operate as the liquid discharge channels. The insulative plate 14 is formed of a mesh or porous material such as glass, ceramics or high polymeric materials and so on. On the inner side of the insulative plate 14, electrodes 15-1 to 15-8 are provided. The electrodes 15-1 to 15-8 substantially extend in a direction perpendicular to the length of dischrge channels 1-1 to 1-8. Other portions are similar to those of FIG. 7. In this embodiment, all the small apertures connected to the liquid chamber 10 are filled with liquid and generate meniscuses. But the changes in meniscuses occur only at the positions near the electrodes 15-1 to 15-8, and the liquid droplets are discharged through the corresponding air discharge channels 1-1 to 1-8.

Figure 9A:
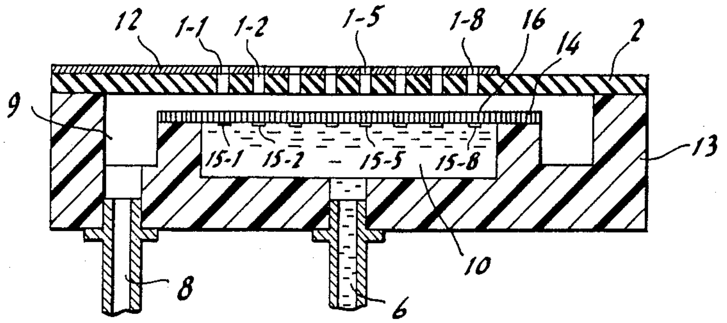
FIGS. 9*a* and 9*b* are illustrations of a further modified printing head of the invention.
Figure 9B:
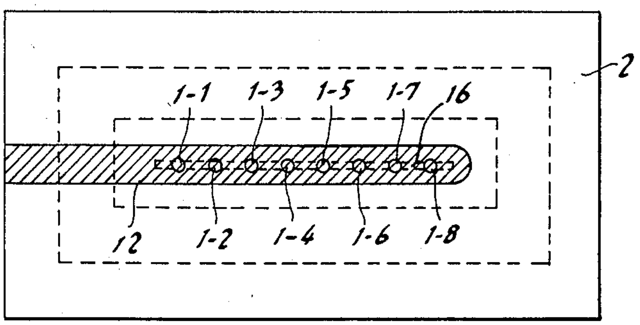

In FIGS. 9*a* and 9*b*, the insulative plate 14 has a slit 16 the longitudinal axis of which is opposed to the direction of the arrangement of the air discharge channels 1-1 to 1-8. On the inner side of the insulative plate 14, electrodes 15-1 to 15-8 are disposed. The electrodes 15-1 to 15-8 substantially extend in a direction perpendicular to the slit 16 and cut off or continue beneath the slit 16. Other portions are similar to those of FIG. 7. The meniscus is generated along the slit 16 in continuation, but changes occur only at the portion near the elecrtrode 15-1 to 15-8 as mentioned in FIG. 8.

Figure 10B:
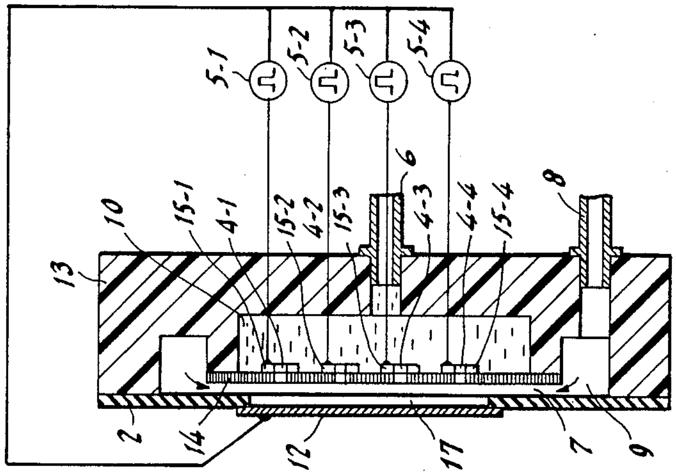
FIGS. 10*a* and 10*b* are illustrations of a further modified printing head of the invention.
Figure 10A:
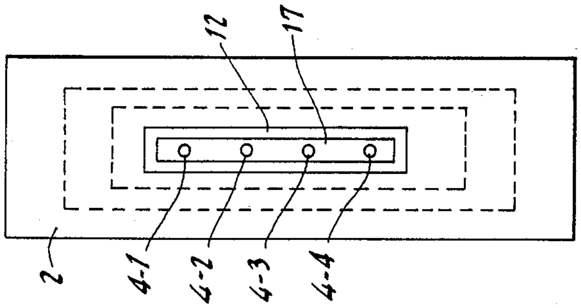

In FIGS. 10*a* and 10*b*, the nozzle plate 2 has a slit nozzle 17 the longitudinal axis of which is opposed to the direction of the arrangement of the liquid discharge channels 4-1 to 4-4. The common electrode 12 is provided around the periphery of the slit nozzle 17. Other portions and operations are similar to those of FIG. 7.

In the embodiments in FIGS. 8 to 10 it is easy to arrange the liquid discharge channels and the air liquid discharge channels in order, so that multi nozzle-type ink jet head having same characteristic is obtained economically.

Figure 11A:
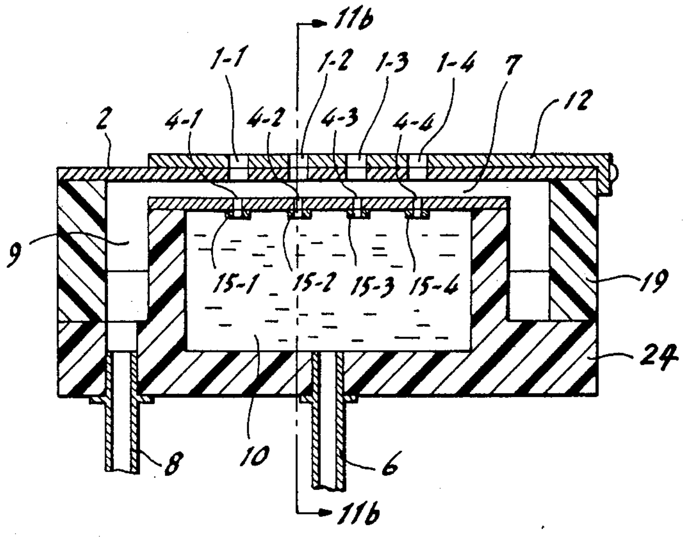
FIGS. 11*a* and 11*b* are illustrations of a further modified printing head of the invention.
Figure 11B:
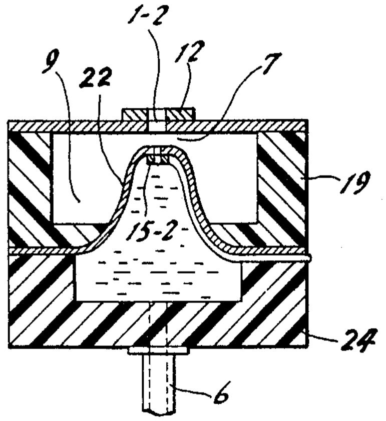

Referring now to FIGS. 11*a* and 11*b*, a further modified embodiment of the invention is shown. In FIG. 11, a flexible insulative plate 22 is provided through which the liquid discharge channels 4-1 to 4-4 are provided. The flexible insulative plate 22 is projected toward the air discharge channel and both sides of which are put between body members 19 and 24. On the inner side of the flexible insulative plate 22, the electrodes 15-1 to 15-4 are provided. Other portions and operations are similar to those of FIG. 7. According to the embodiment in FIG. 7, the liquid chamber 10 has sufficiently large capacity to discharge full amount of the liquid. Furthermore, it is possible to lower the flow resistance of the air stream in the air layer 7, thereby the air discharge channels are arranged without harming uniformity of the air discharges from the air discharge channels.

What is claimed is:

1. An ink jet printing head comprising an air flow chamber having a front channel, an air intake channel connected to a source of pressurized air for directing an airstream to said front channel so that the airstream makes a sharp turn at the entry into said front channel creating a sharp pressure gradient, a liquid chamber connected to a source of ink, an insulative plate defining on one side thereof part of said liquid chamber and defining on the other side thereof part of said air intake channel, the insulative plate having a rear channel axially aligned with said front channel, a first electrode disposed around said front channel, and a second electrode disposed on a rear side wall of said insulative plate and encircling said rear channel for establishing an electric field between said first and second electrodes by which liquid is discharged from the liquid chamber through the aligned rear and front channels in response to a potential developed across said first and second electrodes.

2. An ink jet printing head as claimed in claim 1, wherein said rear channel has a small aperture at rear side thereof and a large aperture at front side thereof.

3. An ink jet printing head as claimed in claim 1, wherein a plurality of front channels and rear channels is provided.

4. An ink jet printing head as claimed in claim 3, wherein around said rear channels a plurality of separate electrodes are provided.

5. An ink jet printing head as claimed in claim 3, wherein said rear channels are composed of very small apertures in said insulative plate.

6. An ink jet printing head as claimed in claim 5, wherein said insulative plate is made of insulative mesh.

7. An ink jet printing head as claimed in claim 5, wherein said insulative plate is made of porous members.

8. An ink jet printing head as claimed in claim 3, wherein said rear channels are formed along a slit opened through the insulative plate.

9. An ink jet printing head as claimed in claim 1, wherein said rear channel is provided through a flexible plate, the rear channel portion of which is projected toward said front channel.

10. An ink jet printing head as claimed in claim 1, wherein said front channel is a slit opened through a nozzle plate.

11. In an ink jet printing head comprising an air flow chamber having a front channel, an air intake channel connected to a source of pressurized air air for directing an airstream to said front channel, a liquid chamber connected to a source of ink, and a first electrode disposed in the vicinity of said front channel, the improvement comprising:

a structural member separating said liquid chamber from said front channel and having a rear channel therein, said structural member having means for concentrating an electrical field generated by said electrode on a meniscus of liquid in said rear channel, whereby reduced voltage levels and duration may be applied to said electrode to discharge liquid through said front channel.

12. An ink jet printing head as recited in claim 11 wherein said means for concentrating said electrical field on the meniscus of said liquid includes conductive means at an inlet side of said rear channel in said structural member, and insulating means provided at an outlet side of rear channel in said structural member.

13. An ink jet printing head as recited in claim 12 wherein said insulating means comprises an insulating plate forming said structural member and said conductive means comprises a second electrode forming a conductive plate on a rearward side of said insulating member surrounding the inlet to said rear channel provided therein.

14. An ink jet printing head as recited in claim 13 wherein said structural member includes a plurality of rear channels formed therein, each axially aligned with one of a plurality of front channels, and said conducting means comprises separate conductive plate members surrounding the inlet to each of said rear channels formed in said insulating means.

* * * * *